United States Patent
Zak et al.

(10) Patent No.: US 7,472,170 B2
(45) Date of Patent: Dec. 30, 2008

(54) SYSTEM AND METHOD FOR MANAGING CONTENT ON A NETWORK INTERFACE

(75) Inventors: Bruce Zak, 3622 Northwood, West Bloomfield, MI (US) 48324; Regina Zak, West Bloomfield, MI (US)

(73) Assignee: Bruce Zak, West Bloomfield, MI (US)

( * ) Notice: Subject to any disclaimer, the term of this patent is extended or adjusted under 35 U.S.C. 154(b) by 574 days.

(21) Appl. No.: 10/366,168

(22) Filed: Feb. 13, 2003

(65) Prior Publication Data

US 2004/0196307 A1    Oct. 7, 2004

(51) Int. Cl.
 *G06F 15/16* (2006.01)
(52) U.S. Cl. .................. 709/218; 709/228; 705/26; 719/328
(58) Field of Classification Search .......... 709/223, 709/225, 226, 238, 220, 227, 206, 218, 224, 709/229; 705/25, 26; 719/328
See application file for complete search history.

(56) References Cited

U.S. PATENT DOCUMENTS

| | | | | |
|---|---|---|---|---|
| 7,017,162 | B2 * | 3/2006 | Smith et al. | 719/328 |
| 7,115,504 | B2 * | 10/2006 | Moore et al. | 438/660 |
| 2003/0009395 | A1 * | 1/2003 | Yu et al. | 705/27 |
| 2004/0230679 | A1 * | 11/2004 | Bales et al. | 709/225 |
| 2005/0246716 | A1 * | 11/2005 | Smith et al. | 719/315 |
| 2006/0248181 | A1 * | 11/2006 | Glassco et al. | 709/223 |
| 2006/0248182 | A1 * | 11/2006 | Glassco et al. | 709/223 |
| 2008/0120129 | A1 * | 5/2008 | Seubert et al. | 705/1 |

OTHER PUBLICATIONS http://www.microsoft.com.
http://www.vignette.com.
http://www.zenacomp.com/bin/site/wrappers/splash.asp.
http://www.documentum.com.
http://www.divine.com/servlet/ContentServer?pagename=home.
http://www.starphire.com.
http://www.zope.org.
http://www.macromedia.com/software/contribute.

* cited by examiner

*Primary Examiner*—Khanh Dinh
(74) *Attorney, Agent, or Firm*—Rader, Fishman & Grauer PLLC

(57) ABSTRACT

The disclosed invention is a system and method (collectively the "system") for the automated management of content on a network interface. The network interface can be a web site on the World Wide Web, an Internet location, an intranet location, an extranet location, or some other form of network interface (collectively "web site"). The system can automatically create applications and links to those applications without human intervention. Examples of automated applications include newsroom applications, calendar of events, employment opportunities, project portfolio, biographies, frequently asked questions, document library, category management, product catalogs, e-mail broadcasts, surveys, and newsletters. Fully normalized hierarchies of business rules and user profiles can be supported by the system to facilitate automation and configurability. Multiple content providers can manage a single web site in a simultaneous or substantially simultaneous manner. In ASP embodiments, multiple organizations can use the system to manage multiple web sites in a substantially simultaneous manner.

29 Claims, 12 Drawing Sheets

SYSTEM AND METHOD FOR MANAGING CONTENT ON A NETWORK INTERFACE

BACKGROUND OF THE INVENTION

The invention is a system and method (collectively the "system") for the automated management of content on a network interface.

Businesses, government entities, non-profit organizations, social groups, religious organizations, universities, research institutions, individuals, and other entities (collectively "entities") increasingly rely on network interfaces such as web sites on the World Wide Web, Internet sites, intranet sites, extranet sites, and other network interfaces (collectively "web sites") to communicate and interact with customers, potential customers, vendors, potential vendors, investors, potential investors, employees, potential employees, the general public, and other types of audiences (collectively "users").

Despite the increasing importance of web sites, many web sites are out of date and as such, display inaccurate and potentially misleading information. The challenge of keeping a web site up to date can be a difficult goal for even large entities with substantial resources. For smaller entities, keeping a web site up to date that is fully loaded with information and functionality is typically not a realistic option. Smaller entities with correspondingly fewer resources and personnel, find it difficult to effectively manage the content on their web sites due to a limited number of personnel skilled in the technologies of website creation. Many organizations ultimately refrain from providing content-rich web sites because of the maintenance challenges, and the embarrassment of outdated information. Thus, time-sensitive information is not displayed, the overall utility of the web site is reduced. It would be desirable if the content in web sites could be created, modified, and deleted in an automated manner. It would also be desirable for a web site management system to allow non-technical content providers control the content of web sites without the intervention of more technical personnel.

Even in large entities, the personnel responsible for managing web sites from an information technology perspective are often not the persons best situated to manage the content of the web site. In the context of web sites that are "rich" in content, there may be several different persons or even groups of people, responsible for the management of content. Thus, even the routine management of web site content can require multiple interactions and communications between various persons filling various roles with the entity sponsoring the web site. For each extra person involved in the management process, the number of communication links can increase exponentially. It would be desirable to save time and resources while at the same time reducing the possibility for errors by reducing the number of people needed to manage web site content. It would also be desirable for a web site management system to support the allocation of content responsibilities decided by the entity sponsoring the web site.

Website management is further challenged by the desirability to maintain consistency of style, format, color, and other aesthetics. Such consistency can be difficult to obtain when many different people are involved in a highly manual process. It would be desirable for a web site management system to provide various templates to facilitate the uniform formatting of content.

There is no reason to believe that the existing art provides any solutions to the problems discussed above. There is no suggestion or motivation in the art to provide non-technical personnel with the ability to control the information technology used to manage web sites. Moreover, the existing art affirmatively teaches away from such an approach. Developments in web site technology focus on creating advanced features requiring an increasingly sophisticated level of expertise. Developments in the art do not suggest the ability to provide customizable and automated features in a simpler and less-technical way that can be performed by fewer people.

SUMMARY OF INVENTION

The invention is a system and method (collectively the "system") for the automated management of content on a network interface. The network interface can be a web site on the World Wide Web, an Internet location, an intranet location, an extranet location, or some other form of network interface location (collectively "web site").

The system is a web site management system that allows non-technical users to control the content of a web site without the assistance of technical personnel.

Various applications and links pointing towards those application can be created and configured by the system in an automated fashion. Multiple non-technical content providers can manage the content of a single web site at the same time, or in a substantially simultaneous manner. Highly configurable business rules can be used to automate the administration of the web site, and the management of web site content.

An interface subsystem can be used to capture the inputs of non-technical personnel, in varying content and administrative capacities. A content system can be used to control, create, update, delete, schedule, and otherwise manage content in an automated fashion using the instructions received from the interface subsystem. In some embodiments, an administrative subsystem can be used to create, modify, delete, and otherwise manage the business rules that govern the functionality of the system. A highly modular approach can be used to facilitate a high level of automation with a high level of flexibility and configurability.

Various aspects of the invention will become apparent to those skilled in the art from the following detailed description of the preferred embodiment and the drawings described briefly below.

BRIEF DESCRIPTION OF THE DRAWINGS

Some of the various features, advantages, uses, and characteristics of the present invention can become more apparent by referring to the following description and drawings.

DETAILED DESCRIPTION

The invention is a system and method (collectively the "system") for automatically creating, updating, scheduling, removing, and otherwise managing content accessible from a network interface, such as an Internet location ("Internet site"), an intranet location ("intranet site"), an extranet location ("extranet site"), a web page on the World Wide Web, or any other form of network interface (collectively "web site").

I. Introduction of Elements and Definitions

Figure 1:
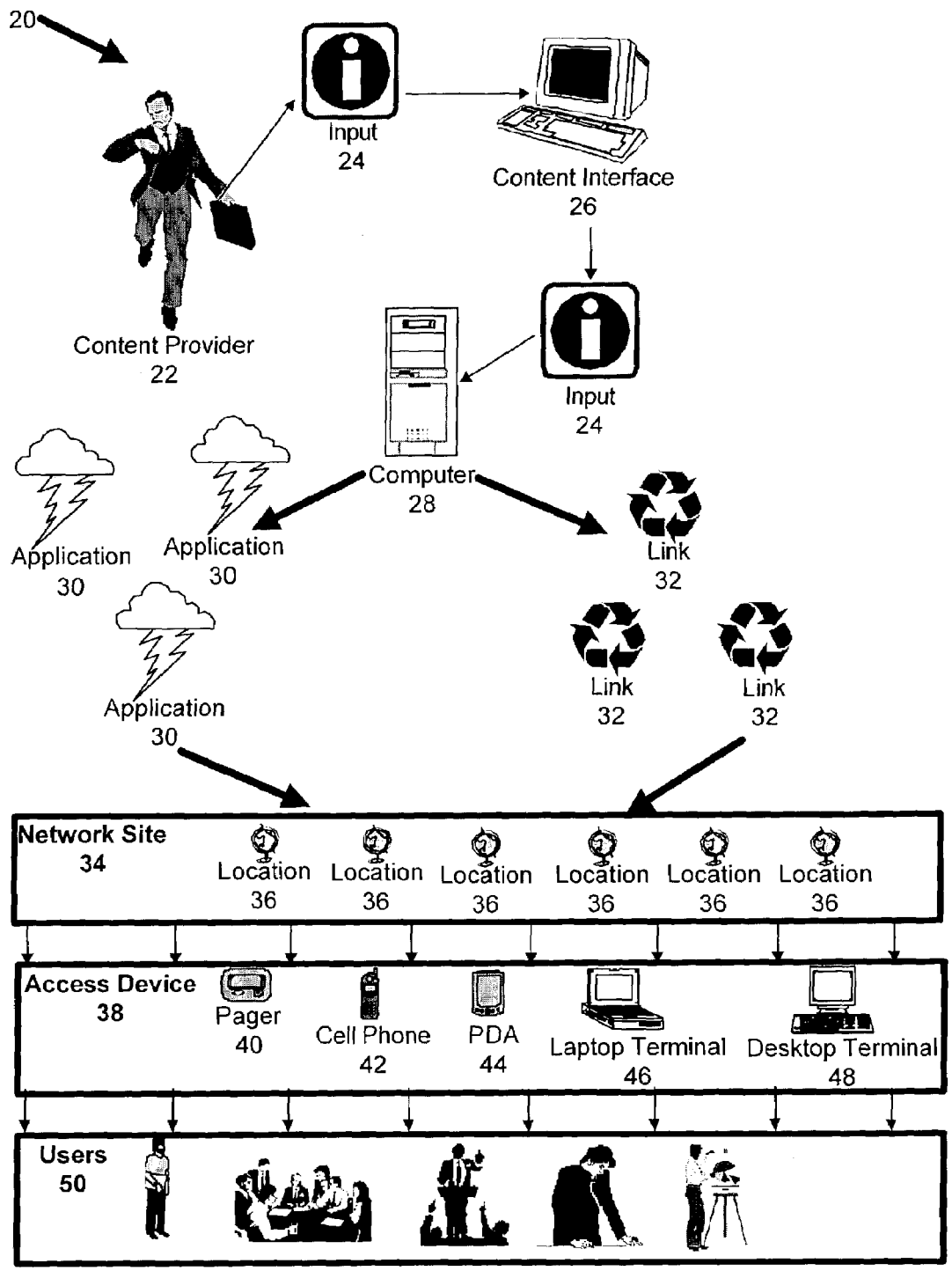
FIG. 1 is an environmental diagram illustrating one example some of the elements that can be incorporated into the system, and subjected to the processing of the system.

FIG. 1 is an environmental diagram illustrating one example of some of the elements that can be incorporated into a web site management system 20. The system 20 can be incorporated into a wide variety of different technical, organizational, and business environments. In some embodiments of the system 20, the technology supporting the system 20 is managed by a third part such as an Application Service Provider (ASP) or some other third party (collectively "third party arrangements"). In third party arrangements, entities benefiting from the system 20 can be charged on a subscription basis, a traffic-based charge, or some other transaction type. In other embodiments, the system 20 is hosted and supported by the organization providing the content the web site.

A. Content Providers

A content provider 22 is potentially any person, machine, device or system that is responsible for providing content to a web site. In a preferred embodiment, the content provider 22 is a person responsible for managing web site content. The content provider 22 need not possess technical skills relating to the creation, modification, or deleting of web sites in order to use the system 20. There can be a wide variety and numbers of content providers 22 that interact with the system 20. In preferred embodiments involving multiple content providers 22, different content providers 22 are responsible for different applications on the web site.

In some embodiments, the content provider 22 can be an expert system, a neural network, a device incorporating artificial intelligence, or some other intelligence technology (collectively "intelligence technology").

Content providers 22 can include administrators responsible for creating, updating, deleting, and scheduling the business rules that govern the functionality of the system 20.

The content provider 22 provides content to the system by providing an input 24 to a content interface 26.

B. Input

Input 24 is any potentially any interaction or omission between the content provider 22 and the content interface 26 that can be captured, understood, received, or otherwise observed by the system 20. Input 24 can also be referred to as input characteristics or input attributes.

A single embodiment of the system 20 can be capable of capturing multiple inputs 24 in a wide variety of different formats and through a wide variety of different mediums.

Input mediums can include typing of data using a keyboard, speaking into a voice recognition component, clicking a mouse, failing to respond to a prompting of the system 20 in a particular period of time, importing of a file, receiving sensor readings, or any other potential medium (collectively "input mediums").

Inputs 24 can also include a wide variety of different data types. Text, numbers, sound, still pictures, multi-media displays, and any other type of data characteristic (collectively "input types") can be used as the inputs 24 of the system 20.

C. Content Interface

The content interface 26 is any interface capable of receiving input 24 from the content provider 22. In preferred embodiments, the content interface 26 utilizes includes some form of a graphical user interface.

The content interface 26 can be housed in any device capable of accessing a network site 34. The content interface 26 can be housed in a desktop computer, a laptop computer, a work station, a pager, a server, a mini-computer, a mainframe computer, a data terminal, a cell phone, a personal digital assistant (PDA), a programmable logic devices, an embedded computer, a cable TV or satellite TV interface, or any other communication device that can access the network site 34. Multiple content interfaces 26 of different types can interact with the system 20 in a simultaneous manner.

The content interface 26 can include both an input view and an output view. The input view allows the content provider 22 to provide input 24 to the content interface 26. The output view allows the content provider 22 to view the input 24 as entered into the input view. In a preferred embodiment, the content interface 26 includes a portal that allows the content provider 22 to access the input view and the output view in a simultaneous or substantially simultaneous manner. In preferred embodiments, the content interface 26 is platform independent with respect to the underlying information technology architecture. The content interface 26 provides a flexible, innovative, and highly configurable hierarchy to manage content on the network site 34. Content providers 22 can be provided with granular access to content on the network site 34 through the use of the content interface 26.

The content interface 26 can also include application view for viewing the inputs 24 and outputs of an application 30 managed by the system. The application view can include an input application view and an output application view.

The content interface 26 receives the input 24 from the content provider 22 and transmits the input 24 to a computer system 28 housing the programming logic that allows the system 20 to function.

D. Computer

The computer or computer system (collectively the "computer") 28 is any device capable of housing the programming logic that allows the system 20 to function. The computer can be a stand alone computer, a server, a mainframe computer, a mini-computer, a web server, an Internet server, an intranet server, an extranet server, a local area network (LAN), a wide area network (WAN), a wireless network, or any other form of computational device. The computer 28 can include ancillary devices and components commonly used in conjunction with the computer 28 itself. In some embodiments, the computer 28 is the same device that houses the content interface 26.

The computer 28 can create, update, delete, or schedule (collectively "manage") an application 30 on the network site 34. In a preferred embodiment, there are many different applications 30 being created, updated, deleted, and schedule at various times by various content providers 22. Applications 30 can be managed in an automated fashion without human intervention. Applications 30 processed by the system 20 are stored in one or more network sites 34.

The computer 28 can also create, update, delete, or schedule (collectively "manage") one or more links 32 on the network site 34 pointing to the various applications 30.

E. Application

An application 30 is a unit of content provided on the network site 34. Applications 30 can include executable software programs, opportunities to exchange data with an outside user 50, files, text, graphics, sound, and other forms of applications 30. Applications 30 may interact with various databases.

Examples of applications 30 that can be incorporated into the system 20 include but are not limited to: a newsroom application; an events application; an opportunity application; a project application; a catalog application; a communications application; a survey application; a newsletter application; a document library; a publicity application; a frequently asked questions application; an about us application; and a third party links application. The various applications 30 that can be incorporated into the system 20 are disclosed in greater detail below.

Applications 30 can be leveraged to support business-to-business, business-to-consumer, and internal business operations.

Applications 30 can be managed automatically by the system 20 without human intervention. Multiple applications 30 on a single network location 34 can be managed by multiple content providers 22 in a simultaneous or substantially simultaneous manner. Applications 30 can be as fully configurable as allowed by the business rules incorporated into the system 20. Configurable applications 30 are those applications 30 that can be modified or configured by the content provider 22. Some configurable applications 30 can also be configured to some degree by the users 50 with respect to how the application performs for that user 50. For example, a user 50 can sign up to receive an e-newsletter in a particular format, such as HTML, PDF, JPEG, etc.

F. Links

A link 32 is the mechanism by which the user 50 of a network site 34 activates the application 30. Links 32 can encapsulate an URL (uniform resource locator), a TCP/IP address, of any other form of identifying the location of applications 30 on the network site 34.

Links 32 can be managed automatically by the system 20 without human intervention. Multiple links 32 on a single network location 34 can be managed by multiple content providers 22 in a simultaneous or substantially simultaneous manner. A configurable link 32 is a link 32 that can be modified or configured by the content provider 22 as permitted by any relevant business rules. A configurable link 32 can be a static code program.

A links display page in the content interface 26 can be used to display the generated link 32 for a specific application 30 selected by the content provider 22. The link 32 can include any necessary parameters and formatting.

G. Network Site and Network Locations

The system 20 can be implemented on a wide variety of different networks. Multiple networks can be incorporated into a single embodiment of the system 20. The network can be the Internet, the World Wide Web, an intranet, an extranet, a local area network (LAN), a wide area network (WAN), or any other form of network (collectively "web site"). The network site 34 can be identified by an URL, a TCP/IP address, or some other form of address.

The network site 34 is made up of one or more locations 36. Just as a web site can include a wide variety of different web pages and areas on those pages, there can be a wide variety of different types of locations 36 on a single network site 34.

H. Access Devices

An access device 38 is any device capable of accessing the network site 34. Some access devices 38 are content provider 22 access devices that house content interfaces 26.

Access devices 38 can also be user access devices. A user access device is an access device 38 that is used by a user 50 to access the content on the network site 34. The same access device 38 can serve as both a user access device and a content provider access device because the type of access device is determined by the nature of the interaction with the access device 38.

Access devices 38 can include a pager 40, a cell phone 42, a PDA 44, a laptop terminal 46, a desktop terminal 48, or any other device capable of accessing the network site 34.

I. Users

A user 50 is potentially any person, search engine, automated engine, or device interacting with the system 20 for the purpose of using or accessing the content on the network site 34. Users 50, in contrast to content providers 22, do not control the content of the network site 34 unless the network site 34 includes an application 30 that manages content on the network site 34 in accordance with the user's interactions with the network site 34. A message board of comments would be one example of the impact a user 50 could have on the system 20.

A user 50 in one context may be a content provider 22 or an administrator in another context. As illustrated in the figure, there are a wide variety of different types of users 50. Users 50 can be internal to the organization controlling the network site 34, and users 50 can be outsiders to the organization controlling the network site 34.

II. User and Administrator Views

Figure 2:
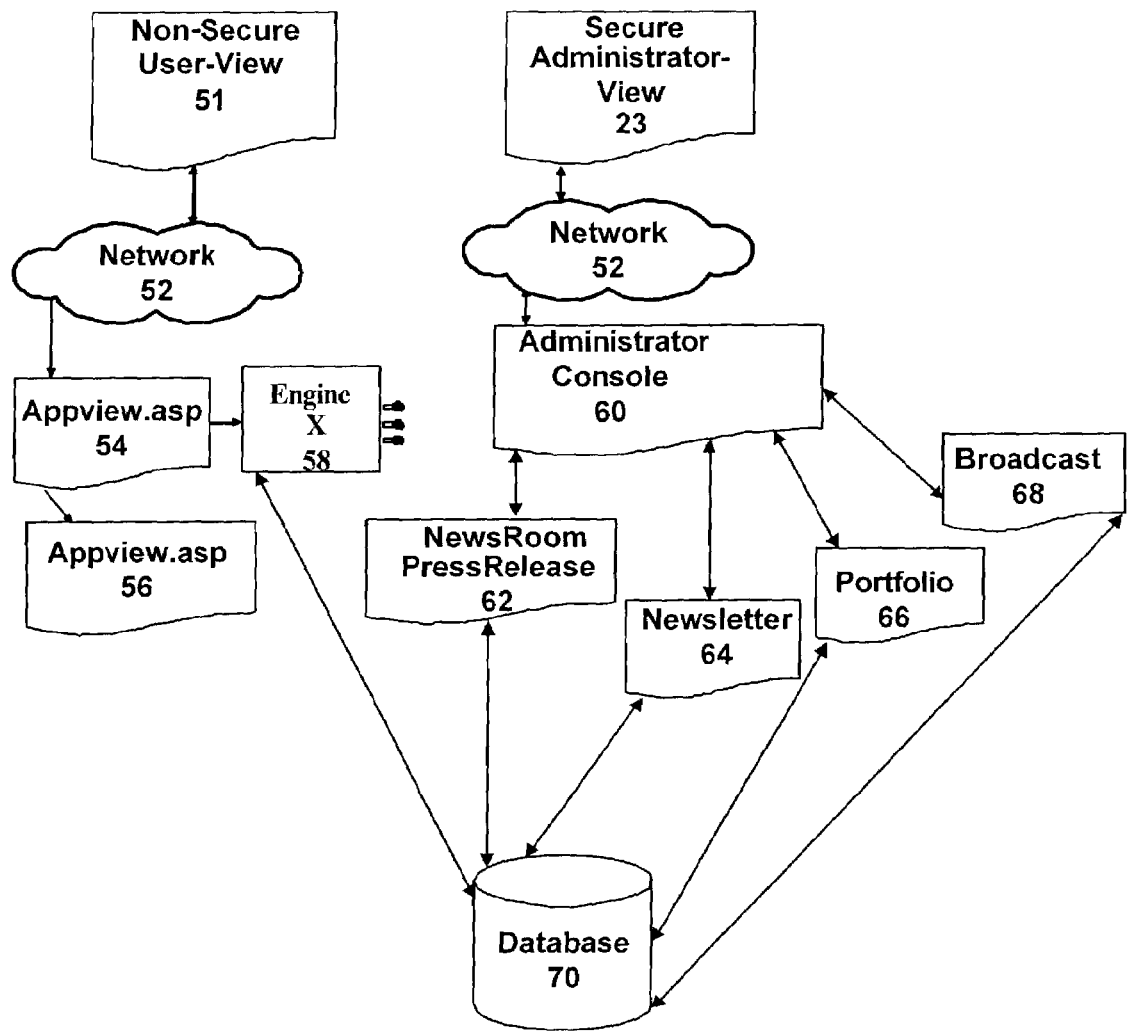
FIG. 2 is an architectural diagram illustrating one example of a technical configuration of the system.

FIG. 2 is an architectural diagram illustrating one example of a technical configuration of the system 20.

The underlying information technology structure of the system 20 can support a user-view 51 and an administrator-view 23. In a preferred embodiment, there are at least two primary categories of views. In some embodiments, there is a separate and distinct content-provider view related to content management, in contrast to the administrator-view 23 which can then be limited to business rule management. In other embodiments, the administrator-view 23 can also be referred to as a content-provider view.

A. User-View

One category of views is the user-view 51. Users 50 access the user-view 51 through one or more of the access devices 38 described above. The connection between users 50 and the system 20 may be secure or non-secure. Some user-views 51 may be purely passive, such as the navigation of a "passive website." Other user-views 51 may include the ability to perform transactions, or trigger other "active" processing. The ability to perform more active processing may require a secure connection. The user-view 51 interacts with a network 52. In a preferred embodiment, the network 52 is a web site or some form of web page.

Through the user-view 51, various applications 30 on the network 52 can be accessed. An appview.asp 54 is a view of one or more applications 30 that are accessible through the user-view 51. Some applications 30 will involve an underlying application engine 58 to perform certain functionality and even access a database 70. For other applications 30, such as the appview.asp at 56, the applications 30 may be more passive in nature, not requiring any type of executable engine or data base access.

B. Administrator-View

The other category of views is an administrator-view 23. The administrator-view is connected to the network 52 through a secure connection so that the content and/or business rules of the system 20 can be managed. An administrator console 60 or administrator portal is used to manage the applications 30 and/or business rules of the system 20. The administrator-view 23 can include both an input view and an output view. By means of example only, the administrator console 60 is shown controlling a newsroom/press release application 62, a newsletter application 64, a portfolio application 66, and a broadcast application 68. The various applications 30 that can be incorporated into the system 20 are disclosed in greater detail below.

All of the various applications 30 can interact with the database 70 as desired to facilitate the functionality of the applications. The administrator-view 23 can be created using a wide variety of different architecture characteristics. In preferred embodiments, an object-oriented design structure is incorporated. The portal engine can utilize a combination of active server page technology, XML, custom style sheets, and database interactions to provide access to specific application 30 links 32 for users 50 and groups of users 50.

The administrator-view 23 can be used to allow users 50 and groups of users to have highly configurable templates based on the individual needs of the users 50.

C. Other Architecture Characteristics

The system 20 can be build upon a wide variety of different information technology environments. In a preferred embodiment, active server page technology is used. Java or the Java scripting language can be used to make the system 20 "browser agnostic" and platform independent to users 50. Each functional area of each application 30 can be broken down into a set of active server page modules.

In a preferred embodiment, the database 70 is a relational database. In alternative embodiments, the database 70 can be an object-oriented database, a binary database, a series of flat files and arrays, or some other data storage arrangement. In a preferred embodiment, all database 70 logic and queries are encapsulated in the form of stored procedures.

III. Input Characteristics

Figure 3:
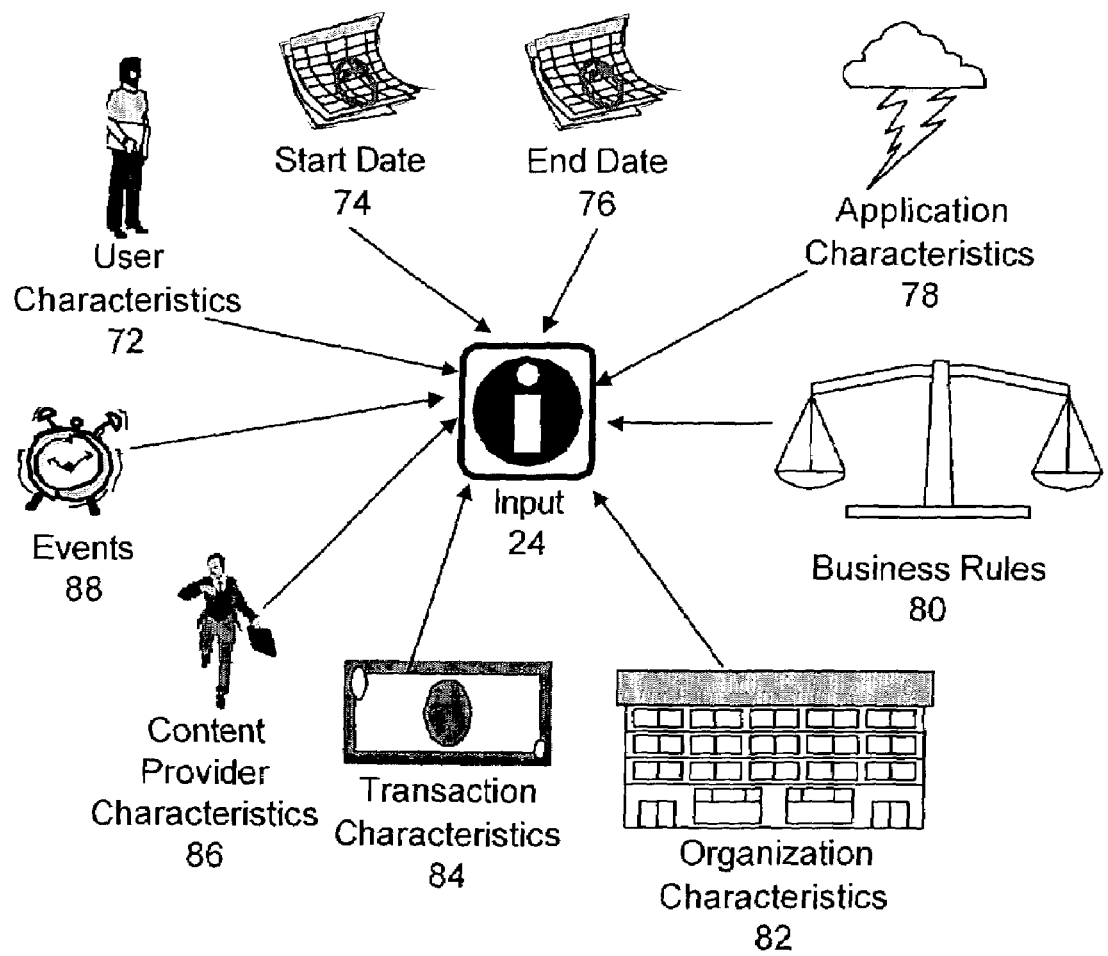
FIG. 3 is a block diagram illustrating one example of the different types of data and information that can be input into the system.

FIG. 3 is a block diagram illustrating one example of the different types of data and information that can be input into the system. The flexibility of system 20 is in part related to the variety of inputs 24 that can be incorporated into the system 20.

A. User Characteristics

A user characteristic 72 is potentially any characteristic relating to the user 50. It can include user profiles; login requirements; past use of the system 20; affiliation with various organizations, groups, or subgroups; an e-mail address or other contact information; or any other attribute relating to the user 50.

B. Start Date

Applications 30 can be configured to begin on a particular date/time that is referred to as a start date 74. For example, a particular product promotion may be scheduled to occur in the future, the content provider 22 can provide the relevant content to the system 20 before the promotion date because a start date 74 for the promotional content will allow the system 20 to schedule the display of the promotional content at the appropriate day and time.

C. End Date

Applications 30 can also be configured to end on a particular date/time that is referred to as an end date 76. In the example of a product promotion, the expiration of the program can be inputted into the system 20 in advance so that out of date promotional materials will not be displayed on the network site 34. The start date 74 and end date 76 for content and applications 30 can be entered by the content provider 22 at the time in which the content itself is entered, or those inputs 24 can be provided at a later date.

D. Application Characteristics

Application characteristics 78 can include potentially any attribute relating to an application 78. Application characteristics 78 can include start dates 74, end dates 76, and other inputs 24, including other inputs 24 displayed in FIG. 3.

E. Business Rules

A business rule 80 is any rule incorporated into the system 20 that controls how the system 20 functions. For example, business rules 80 may control how content providers 22 interact with the content interface 26, or how multiple content providers 22 may manage different applications 30 in a simultaneous or substantially simultaneous manner.

Business rules 80 can exist any many different levels of the system 20. A business rule set by an ASP can be referred to as an ASP-based business rule. A business rule effective an entire organization can be referred to as an organization-based business rule. A business rule that applies only to a group within an organization can be referred to as group-based business rule. A business rule that applies only to a sub-group of a group can be referred to as a sub-group-based business rule. A business rule that applies to users 50 can be referred to as a user-based business rules. Business rules can exist at multiple levels at the same time. User profiles can similarly exist at this various levels, and are closely related to business rules. Many business rules can utilize profiles to impact the processing that is performed.

F. Organization Characteristics

An organization characteristic 82 is potentially any characteristic or attribute relating to an organization. An organization or entity can be composed of various groups, sub-groups, and personnel. An organization or entity can also have relationships and roles with other organizations, such as customer, vendor, regulator, competitor, etc.

G. Transaction Characteristics

A transaction characteristic 84 is potentially any characteristic or attribute relating to a transaction. Transaction characteristics 84 can include buyers, sellers, payors, payees, transaction types, transaction items, monetary amounts, payment terms, jurisdictions, and virtually any other characteristic or attribute.

H. Content Provider Characteristics

A content provider characteristic 86 is potentially any characteristic or attribute describing or relating to a content provider 22. It can include profiles; login requirements; past use of the system 20; affiliation with various organizations, groups, or subgroups; an e-mail address or other contact information; authorization levels; or any other attribute relating to the user 50.

I. Events

An event 88 is potentially any occurrence (or representation of an occurrence) in the system 20 that can serve as a trigger or distinction for some other process in the system 20. For example, the expiration of a product promotion can be an event 88 in the system 20 that could trigger the beginning of a new product promotion. Business rules 80 can use events 88 to further automate and configure the system 20.

IV. Subsystem-Level View

Figure 4:
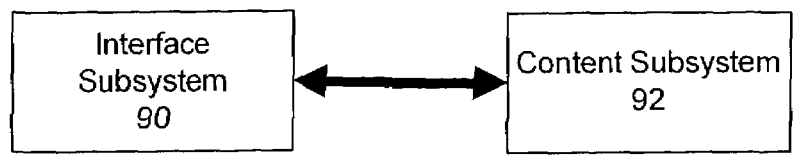
FIG. 4 is a block diagram illustrating one example of a subsystem-level view of the system, including an interface subsystem and a content subsystem.

FIG. 4 is a block diagram illustrating one example of a subsystem-level view that includes an interface subsystem 90 and a content subsystem 92. As illustrated by the two-directional arrow, processing can bounce back and forth between these two subsystems.

A. Interface Subsystem

An interface subsystem 90 can be responsible for all system 20 interactions with the outside world, including users 50, content providers 22, and administrators. A user 50 can interact with the interface subsystem through a user-interface, a content provider 22 can interact with the system 20 through a content provider interface (or content interface 26), and an administrator can interact with the system 20 through an administrator interface.

The interface subsystem 90 is configured to capture various inputs 24 that are used by the system 20 to automatically create configurable applications 30 and configurable links 32. The system 20 can the automatically embed the configurable links 32 in accordance with application characteristics 78, such as start dates 74 and end dates 76, as well as other forms of input 24. The various configurable links 32 point the various configurable applications 30.

The end date 76 received by the interface subsystem 90 can be used by the system 20 to trigger the automatic removal of an application 30 from the network site 34 on the date and time indicated by the end date 76.

The interface subsystem 90 can include multiple content interfaces 26 for capturing input 24 at the same time, or in a substantially simultaneous manner. The interface subsystem 90 allows content providers 22 without information technology expertise, to manage the network site 34. The various applications 30 can have different start dates 74 and end dates 76. Different content interfaces 26 can be used to create different applications 30 and links 32 on the same network site 34 in a simultaneous or substantially simultaneous manner. Business rules 80 can impact how applications 30 and links 32 are managed by the system 20.

As discussed above, profiles can be used by the business rules 80 of the system 20 to automate functionality while at the same time supporting the ability to customize the functionality of the system 20. Profiles are associated with the system 20 through the particular interfaces of the interface subsystem 90 used by those various persons. Profiles can be ASP-level profiles, organization-level profiles, group-level profiles, sub-group-level profiles, and user-level profiles. If the system 20 is provided in a third party arrangement to organizations on a subscription basis, a subscriber profile can also be incorporated into the system 20. In a third party arrangement, multiple organizations can modify their various network sites 34 in a simultaneous or substantially simultaneous manner.

B. Content Subsystem

A content subsystem 92 includes all of the applications 30 and links 32 on the network site 34 as well as the network site 34 itself. Content subsystems 92 can be configured in a wide variety of different ways, including all possible combinations of applications 30 and links 32 that can be managed by the system 20.

The various applications of the content subsystem 92 are described in greater detail below. Users 50, content providers 22, and administrators interact with the content subsystem 20 through the interface subsystem 90. The functionality of the content subsystem 92 can be performed in an automated manner without human intervention after the receipt of the input 24 from the interface subsystem 90.

C. Administrator Subsystem

Figure 5:
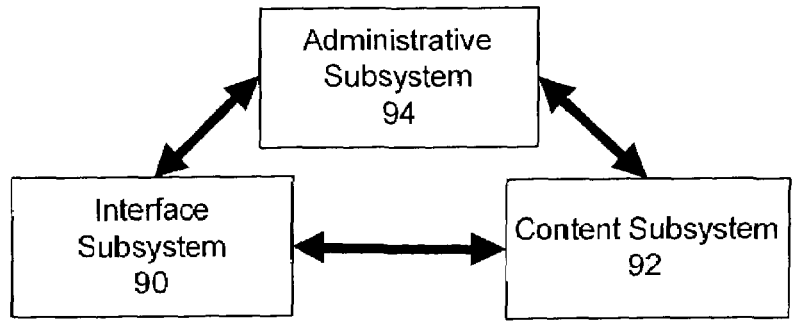
FIG. 5 is a block diagram illustrating another example of a subsystem-level view of the system, including an administrative subsystem.

FIG. 5 is a block diagram illustrating another example of a subsystem-level view of the system, including an administrative subsystem 94. The administrator subsystem 94 can be used by various administrators to configure the business rules of the system 20 in the same way that the content subsystem 92 controls the management of the content or applications 30 of the system 20. Business rules 80 control how persons such as users 50 and content providers 22 interact with the system 20. Business rules 80 can incorporate a high degree of flexibility, because they can be created and enforced at various different levels in an overlapping fashion.

V. Overall Process Flow

Figure 6:
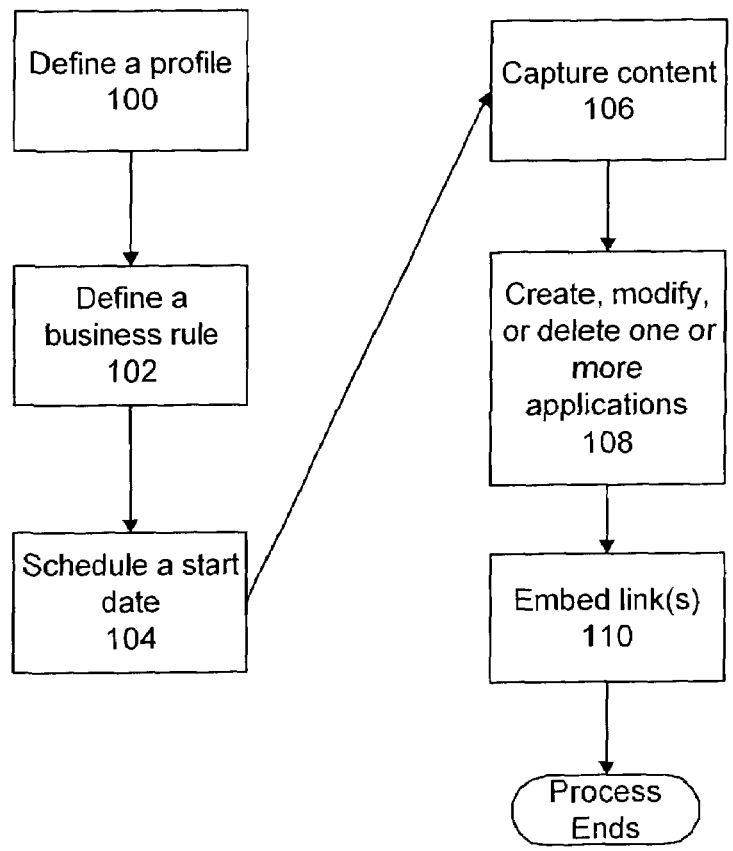
FIG. 6 is a flow chart illustrating one example of a process flow that can be incorporated into the system.

FIG. 6 is a flow chart illustrating one example of a process flow that can be incorporated into the system 20.

At 100, a profile can be defined. The profile can relate to a user, a subgroup, a group, an organization, or even an ASP. Profiles can determine what menu options are visible, enabled, disabled, etc. Profiles also impact the application of business rules 80 by the system 20. The system 20 can support a complex hierarchy of profiles.

At 102, a business rule 80 can be created or defined. An example of a business rule 80 would be that a particular group within an organization could only modify certain applications 30 on the network site 34 of the organization. The system 20 can support a complex hierarchy of business rules 80. In some embodiments, business rules 80 at a higher level within the system 20 can be used to override business rules 80 set at lower levels. In other embodiments, lower level business rules 80 trump high level business rules 80 because the lower level business rules 80 are more specifically tailored.

At 104, a start date 74 for a particular application 30 is scheduled. An end date 76 could also be scheduled in the same interaction with the system 20. In some embodiments, multiple start dates 74 and end dates 76 can be entered at the same time for multiple applications 30 and links 32.

At 106, content for the various applications 30 and links 32 are captured using the interface subsystem 90. Inputs 24 as discussed above, can come in a variety of different mediums, formats, and data types.

At 108, the system 20 can automatically create, modify, or delete one or more applications 30. Links 32 to the created or modified application 30 can similarly be created or modified, and links 32 to deleted applications 30 can similarly be deleted.

At 110, links 32 pointing to the active applications 30 can be automatically embedded into the network site 34. In a preferred embodiment, the network site 34 is preformatted with respect to the locations of certain applications 30, and the network site 34 can include a predefined or pre-formatted navigation tool or structure such a menu to facilitate user 50 navigation.

VI. Application-Level View

Figure 7:
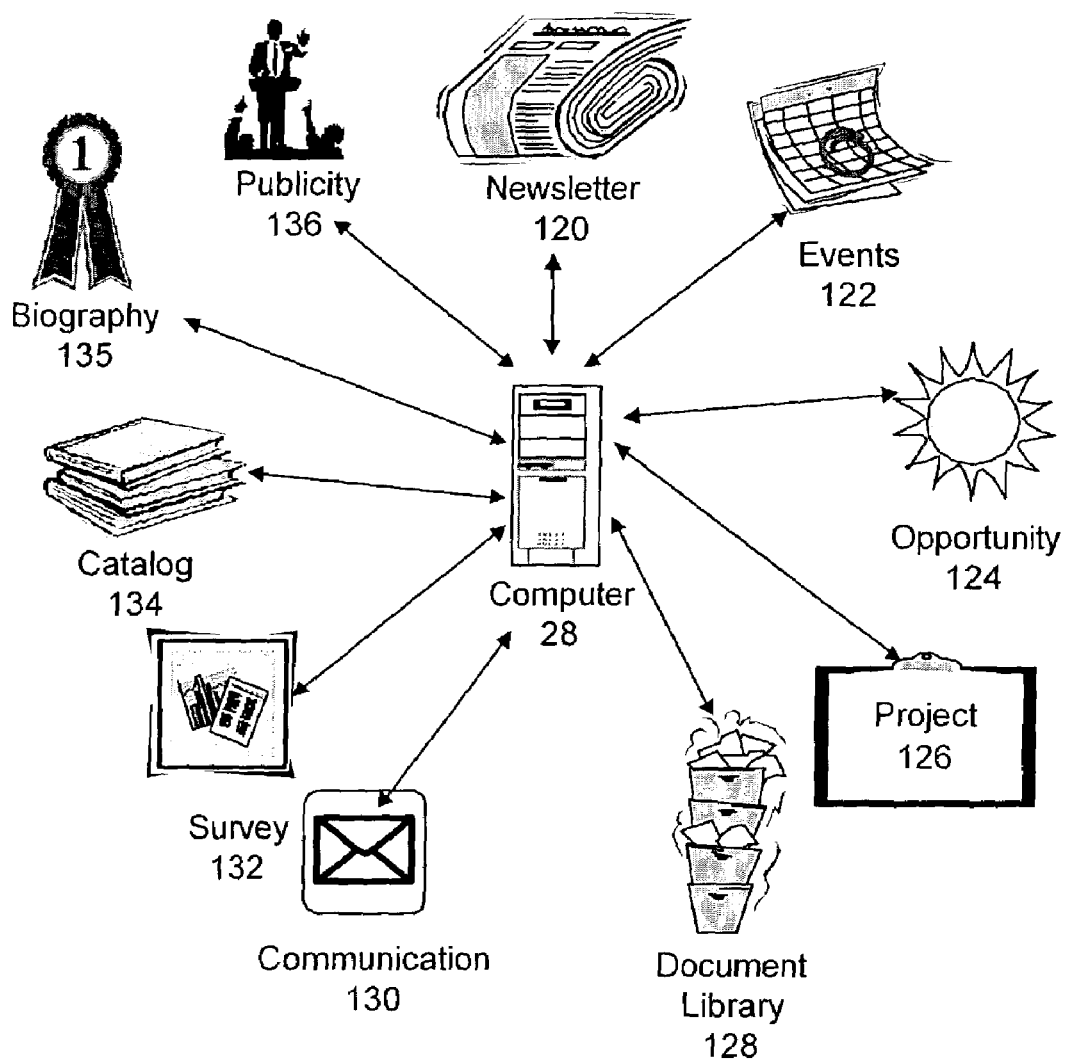
FIG. 7 is a block diagram illustrating one example of the different types of applications that can be incorporated into the system.

FIG. 7 is a block diagram illustrating one example of the different types of applications 30 that can be incorporated into the system 20. Each of the illustrated applications 30, as well as other applications 30 incorporated into the system 20, can be housed in the computer 28 or computer system 28 that houses the logic for the automated application and link generation process. The exact configuration of applications 30 can vary widely from embodiment to embodiment. As web site practices evolve over time, the number and types of applications 30 can similarly evolve.

A. Newsletter

A newsletter application 120 can be used by an organization to distribute information about itself to persons inside and outside the organization. A newsletter application 120 can be limited to individual press releases or articles. In other embodiments, the newsletter application 120 can also include the active distribution of an electronic newsletter that includes various articles or press releases bundled together in the unit of a newsletter. The newsletter can incorporate different categories of stories, and can be configured to accommodate profile information relating to the recipient or viewer of the newsletter. Images, sounds, and other non-text data can be incorporated into the newsletter application 120. The newsletter application 120 can include links to content on public third party networks, such as public web sites.

Articles can be searched and edited through the use of the newsletter application 120. Articles can be organized into a hierarchy of categories based on the subject matter, intended audience, organization-hierarchy, and virtually any other characteristic or attribute relating to the articles.

B. Events

An event application 122 can be responsible for displaying and scheduling relevant events 88. The business rules 80 can automatically invoke certain processing based on events 88. For example, a special type of promotion may automatically trigger the sending out of an e-mail announcement. Profiles can also determine the types of events 88 that can be viewed by a particular user 50. For example, if an event 88 is only relevant to users 50 of a particular subgroup, the business rules 80 may hide the event 88 from other users 50. Event minutes can be created and displayed using the event application 122.

Events 88 can be added, updated, deleted, and scheduled using the events application 122. Events 88 can be organized into a hierarchy of categories based on the subject matter, intended audience, and virtually any other characteristic or attribute relating to the event 88.

C. Opportunity

An opportunity application 124 can provide a means for communicating employment opportunities, transaction opportunities, and other types of opportunities specifically identified on behalf of an organization or some sub-unit of the organization.

Opportunities can be added, updated, deleted, and scheduled using the opportunities application 124. Opportunities can be organized into a hierarchy of categories based on the subject matter, intended audience, and virtually any other characteristic or attribute relating to the opportunity.

D. Project

A project application 126 can also be referred to as a project portfolio application 126. The project application 126 provides a mechanism for organizations and sub-units of organizations to create, update, and delete information about various projects. Some projects can be open to public view while others are limited to internal users 50. Projects can be organized into a hierarchy of categories based on the subject matter, intended audience, and virtually any other characteristic or attribute relating to the project. Links for additional information can be provided, as well as image files containing detailed project schedules.

Projects can be made visible/invisible on a case by case basis by an administrator, or the visibility of projects can be determined by business rules relating to the organization or sub-unit of the organization.

E. Document Library

The purpose of a document library 128 is to provide a mechanism to publish documents of various types within an organization's web site for a targeted user, subgroup, group, or organization. In preferred embodiments, once a document is published outside the public group, it can then be assumed that it will be secured pursuant to extranet functionality. Documents can be searched, edited, created, and deleted using the document library application 128.

Documents can be added, updated, deleted, and scheduled using the document library 128. Documents 88 can be organized into a hierarchy of categories based on the subject matter, intended audience, and virtually any other characteristic or attribute relating to the document.

F. Communications

A communication application 130 can be used by users 50 to interact with the organization sponsoring the web site. The communications of the communication application 130 can include a frequently asked questions module, a broadcast module, and other types of passive and active communications. The broadcast module can include communications by e-mail, instant messaging, chat room posting, automated telephone calls, facsimiles, printed materials, letters, radio communication, satellite communication, or any other mechanism for transmitting information or interacting with others (collectively "communications"). The business rules 80 can trigger the automatic transmission of communications based on events 88, user provided information, or any other attribute or characteristic tracked by the system 20.

Communications can be added, updated, deleted, and scheduled using the communication application 130. Communications can be organized into a hierarchy of categories based on the subject matter, intended audience, and virtually any other characteristic or attribute relating to the communication.

G. Survey

A survey application 132 can be used to capture survey data from both inside and outside the organization sponsoring the web site. Surveys can be created, modified, and deleted using the survey application 132. Survey results can be displayed using the survey application.

Surveys can be organized into a hierarchy of categories based on the subject matter, intended audience, and virtually any other characteristic or attribute relating to the survey. Surveys can be targeted to particular users 50, and can relate to particular sub-units within an organization. For example, different divisions of the organization may collect customer satisfaction data independently of other divisions.

H. Catalog

A catalog application 134 provides an organization with the ability to keep an update catalog of products and services on their web site. In some embodiments, the catalog can interface with transaction enabling technologies to allow users 50 to make purchases online.

Catalogs can be organized into a hierarchy of categories based on the subject matter, intended audience, and virtually any other characteristic or attribute relating to the various offerings. Catalogs can be configured and customize to reflect the interests, roles, and profiles of particular users 50.

I. Biographies

A biography application 135 can used to provide biographical information about persons and groups of persons involved in the organization sponsoring the web site. The format of the biographies can be determined by a business rule 80.

Biographies can be added, updated, deleted, and scheduled using the biography application 135. Biographies can be organized into a hierarchy of categories based on the subject matter, intended audience, and virtually any other characteristic or attribute relating to the biography.

The biography application 135 can display reporting relationships, direct phone numbers, subgroup affiliation, roles, contact information, and other useful information.

In some embodiments, the determination of whether a biography is to be displayed is done in accordance with a business rule 80 applying to the organization or some sub-unit of the organization. In other embodiments, the business rules 80 can provide the determination be made on a case-by-case basis by an appropriate administrator. In such embodiments, the display of biographies need not be consistent in accordance with some overall rule.

J. Publicity

A publicity application 136 allows an organization to manage press releases, advertising, and other forms of promotions (including potentially electronic coupons). In some embodiments, the functionality of the publicity application 136 performed by some of the other applications 30 identified above.

Publicity items can be added, updated, deleted, and scheduled using the publicity application 136. Publicity items can be organized into a hierarchy of categories based on the subject matter, intended audience, and virtually any other characteristic or attribute relating to the publicity.

In preferred embodiments, the functionality of the various applications 30 can be customized and automated in accordance with the business rules 80. Business rules 80 determine what can be viewed, and by whom. Business rules 80 can incorporate a fully normalized processing structure, so that processing elements are treated differently only to the extent that there are differences, and that processing elements are treated similarly only to the extent that there are similarities.

VII. Specific Sub-Processes

A. Portal Setup

Figure 8:
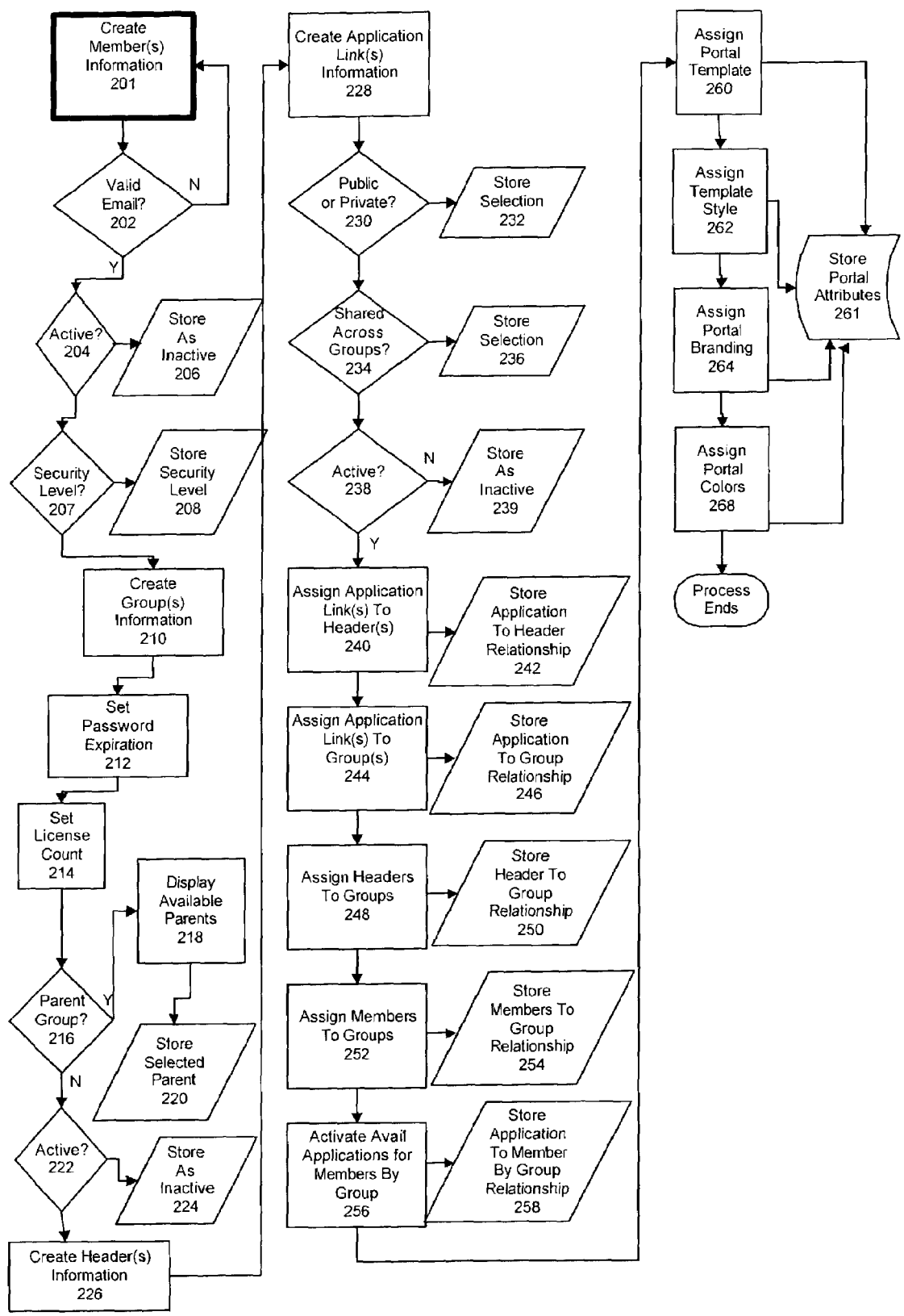
FIG. 8 is a multi-threaded process flow diagram illustrating one example of a portal setup process.

FIG. 8 is a multi-threaded process flow illustrating one example of a portal setup process implemented by an administrator. This process can be referred to as a portal setup heuristic. In the example, the system 20 is managed by an ASP or some similar third party. Members are content providers 22 for organizations that subscribe to the system 20 provided by the ASP. The process of FIG. 8 will be performed by the ASP if the new member is an entirely new organization or subscriber. After an administrator for the new organization or subscriber is setup, the administrator can perform a similar process for other administrators and content providers 22 belonging the organization. In non-ASP and non-third party embodiments, there may be differences with respect to the processing disclosed in FIG. 8.

Membership information for configuring the portal can be created at 201. If that information does not include a valid e-mail address at 202, the system 20 can prevent the process from moving on to subsequent processing. Alternative embodiments may implement different processing rules.

At 204, the administrator can define the member as being either active or inactive. If the member is not active, the system 20 at 206 can store the member information as inactive. In some embodiments, an inactive status will terminate the process. In other embodiments, the process can continue even if the member will not be active immediately.

At 207, the administrator sets the security level for the member if a security level does not currently exist. The security level can be stored at 208.

At 210, group information can be created. A single member can belong to several groups, and possess several roles. In an ASP embodiment involving a new customer, the first group should be at the organization-level for the new subscriber.

Password expiration business rules can be set at 212. A license count can be performed at 214 in an embodiment involving a third party arrangement. At 216, the administrator can identify whether or not the member being created belongs to a group that is in fact a child of another group. If the new group is to be a child group, a display of available parent groups can be displayed at 218. The administrator can select the appropriate parent at 218, and that information can be stored at 220.

The administrator, or in some cases the system 20, determines whether or not the group is an active group at 222. If the member is associated with an inactive group, all of the member information can be stored as inactive at 224. Otherwise, header information can be created at 226. Headers are stored in a header table that is described in greater detail below. Network sites 34 can be divided up into sections. Headers can be associated with the various sections. Headers can be used to describe the various categories of data in a system 20 that preferably incorporates a hierarchical and compartmentalized data design.

Link 32 information for the various applications 30 can be entered by the administrator or content provider 22 at 228. At 230, a determination is made by either the administrator/content provider 22 or by the business rules 80 of the system 20, as to whether a particular link is private of public. That determination is stored at 232. That same determination can be applied to other groups at 234, with the selected groups being stored at 236.

Headers can have a status independent of the groups to which the headers are affiliated. The status of the header is either set or evaluated at 238, and stored at 239.

Application links 32 can be assigned to headers at 240. Only active links can be assigned to active headers. The various application link to header relationships can be stored at 242. Application links 32 can then be associated with various groups at 244. The application to group relationships are then stored at 246. Headers can then be assigned to groups at 248, with those relationships being stored at 250.

Members can then be associated with one or more groups at 252, with those relationships being stored at 254. The activation of a particular application occurs at 256, where available applications 30 can be activated on member by group basis. The storage of application to member by group information occurs at 258.

At 260, a portal template can be assigned. The interface subsystem 90 can provide a wide variety of templates to start from, and additional templates can be created from scratch or from the modification of existing templates. Template styles can be assigned at 262. Template styles do not affect the substance of any application 30 or the functionality of the system 20. Rather template styles allow the portals to be configured to the aesthetic tastes of the content provider 22 or administrator using the portal. Template styles can resemble the choices many GUI operating systems provide users with respect to fonts, on screen control devices (radio buttons vs. check boxes) etc. Portal branding can be assigned at 265 and portal colors can be assigned at 268. At all steps of assigning attributes to the portal, data can be saved at 261.

B. Content Management

Figure 9:
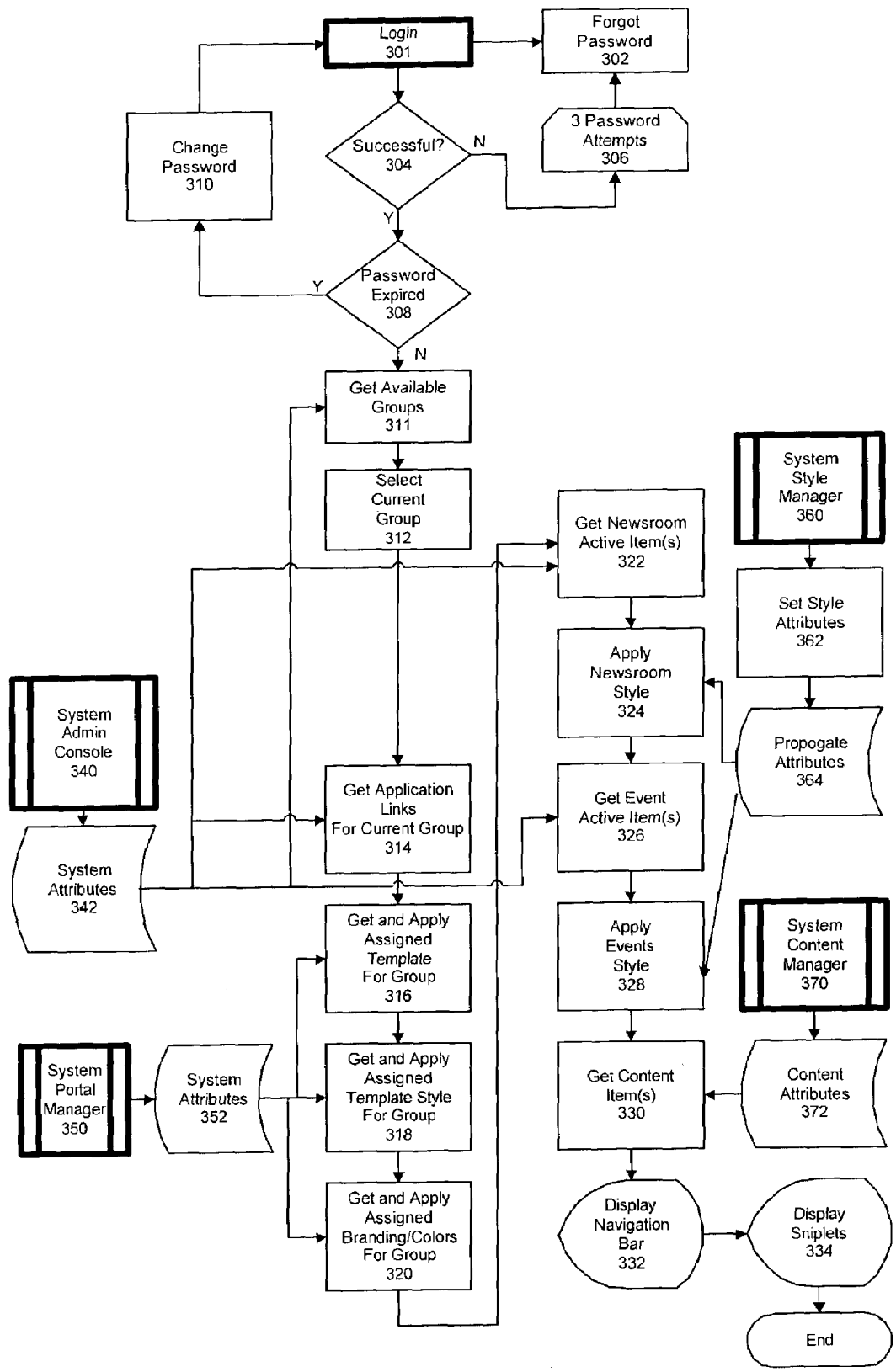
FIG. 9 is a multi-threaded process flow diagram illustrating one example of how various interfaces can be used to interact with the system in managing a web site.

FIG. 9 is a multi-threaded process flow illustrating one example of how various interfaces can be used to interact with the system in managing a web site. This process can be referred to as an interactive heuristic. There are for content provider/administrative functions disclosed in FIG. 9. A system administrative console at 342 can be used to set system attributes such system-level business rules 80 at 344. A system portal manager at 350 can be used to set system attributes relating to the portal at 352. A system content manager at 370 can set, modify, or remove content attributes at 273. A system style manager at 360 can set style attributes at 362 that are then propagated throughout the system at 364. These different functions can be performed in a simultaneous or substantially simultaneous manner, in accordance with the business rules 80 incorporated into the system 20.

For all roles of content providers 22 and administrators, access to the system 20 begins with a login process at 301. If that process is not successful at 304, the login attempts can be limited at 306 to some predefined number or to some number dynamically determined by the business rules 80. The person attempting to access the system 20 can be prompted at 302 if the password has been forgotten. The existing art includes many techniques and methodologies for dealing with persons who have forgotten their passwords. If a password at 308 is determined to be expired, a change password interface can be invoked at 310 to create a new password.

Once the person is logged in, a list of available groups can be displayed at 311. The list is contingent upon the security access associated with the logged in persona. A group can then be selected at 312. Application links for the current group can be obtained at 314. The assigned template(s) can be obtained and applied for the group at 318. The assigned branding and colors can then be obtained and applied at 320.

After step 320, the process steps depend on the particular reason for the person logging in, and the role of that person. The system 20 can obtain active news items at 322 so that the style selected at 362 can be applied to the newsroom at 324. Active events can be obtained at 326 so that changes in style can be applied at 328.

If the purpose of logging in is to modify content, the content items can be obtained at 330 with a new navigation bar being displayed at 332. The updated version of the content can be previewed at 334 before changes are actually made to the system 20.

C. Document Management

Figure 10:
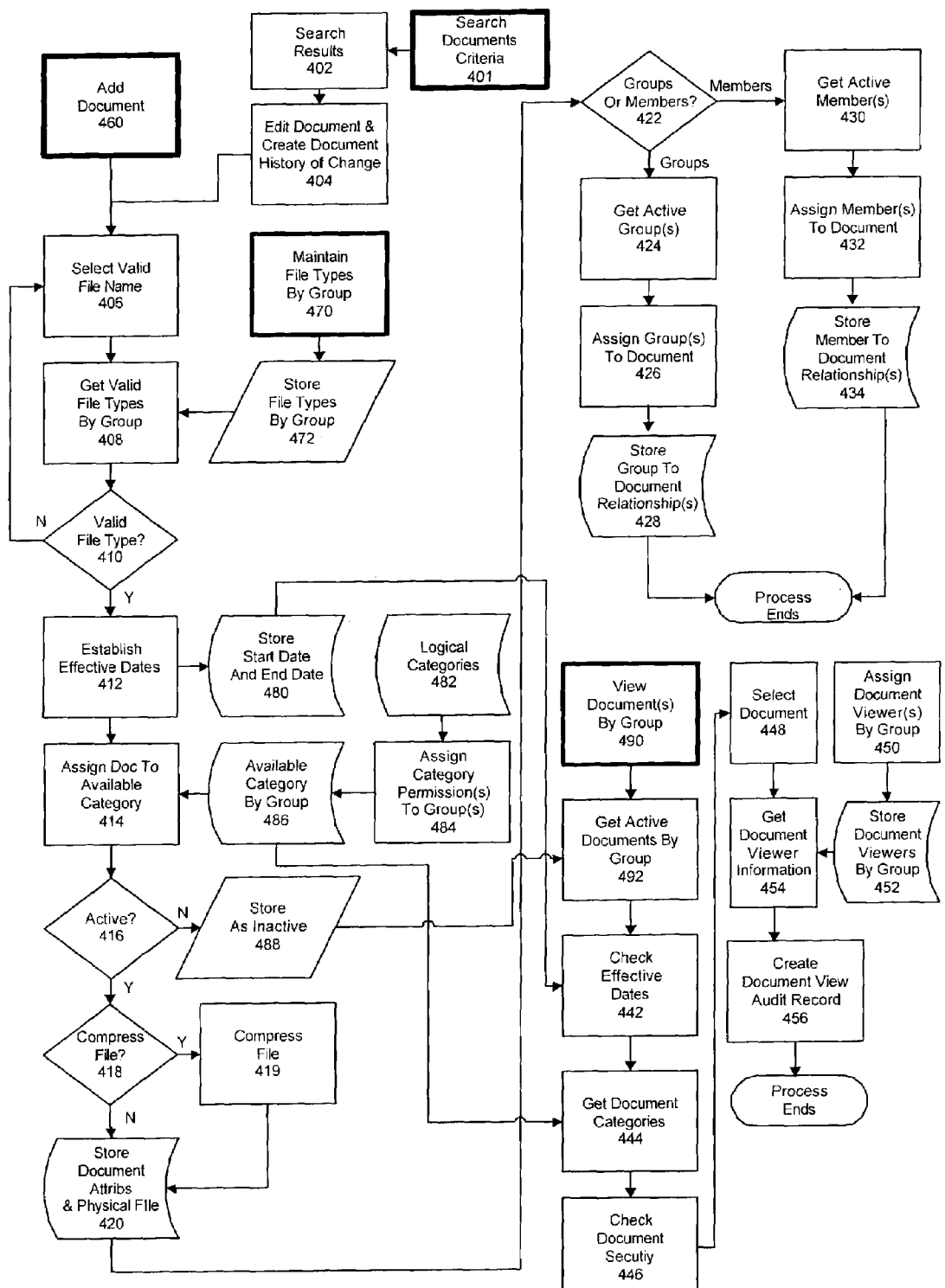
FIG. 10 is a multi-threaded process flow diagram illustrating one example of the processing that can be performed by a document management application incorporated into the system.

FIG. 10 is a multi-threaded process flow diagram illustrating one example of the processing that can be performed by a document management application incorporated into the system. This process can be referred to as a document management heuristic.

The four general categories of processing are a search document step at 401, an add document process at 460, a maintain file types by group method at 470, and a view document by group function at 490.

Documents can be searched at 401 through the use of search criteria. In some embodiments, the system 20 can improve the search criteria supplied by the system 20 by using online dictionaries that include synonyms of the terms in the search criteria. The search results can be view at 402, where a particular document can also be selected for subsequent processing. At 404, a document can be edited, which preferably creates a history of change document to memorialize document history. After step 404, the process for adding a new document is the same as for changing an existing document.

A file name can be selected at 406. The document will also need to be associated with a valid file type. File types are maintained by group at 470. The relationship between files types and groups are stored at 472. If the file type at 410 is not valid, for whatever reason, the process loops back to the selection of a valid file name at 406.

If the file type is valid at 410, the process continues to the establishment of effective dates at 412. Start dates 74 and end dates 76 are stored at 480. That thread then continues on to step 442, which is part of the view documents by group processing that can be invoked at 490, and is described in greater detail below.

Documents can be assigned to available/active categories at 414. Categories are stored on the categories table described below, and can be a powerful tool in compartmentalizing the functionality and data of the system 20. Logical categories can be created at any time in the process at 482 before they are needed to be associated to documents. Category permissions can be assigned to groups at 484. This results in a list of available categories by group at 486 for which a category can be chosen at 414.

The status of the document is either checked or set at 416. If the status is inactive, that status can be stored as inactive at 488. If file compression is deemed desirable at 418 by the system 20 or by the user 50, then a file compression routine can be invoked at 419. The document attributes and physical file can be stored at 420.

At 422 a determination is made as to whether the document is to be accessible to particular groups or to particular members (individuals). If access to the document is to be limited to a particular list of members, then a list of active members is pulled at 430 allowing the document to be assigned to one or more of the members at 432. All member to document relationships can be stored at 434 before processing ends.

If the document is to be accessible to entire groups, a list of active groups is obtained at 424. A selection is made at 426, assigning the document to one or more of the groups. All relationship information can then be stored at 428 before the process ends.

It can be desirable to view documents by group, especially from an administration standpoint. This process is invoked at 490. A list of active documents by group can obtained at 492. The effective dates of those documents can be obtained at 442. Document categories are identified at 444. Document security can be checked at 446. A particular document can then be selected at 448. Document viewer information can be obtained at 454. Viewers are assigned to groups at 450. The relationship between groups and document viewers can then be save at 452 and used at 454. An audit record of all persons accessing the document is created and updated at 456 before the process terminates.

VII. Object-Level View

Figure 11:
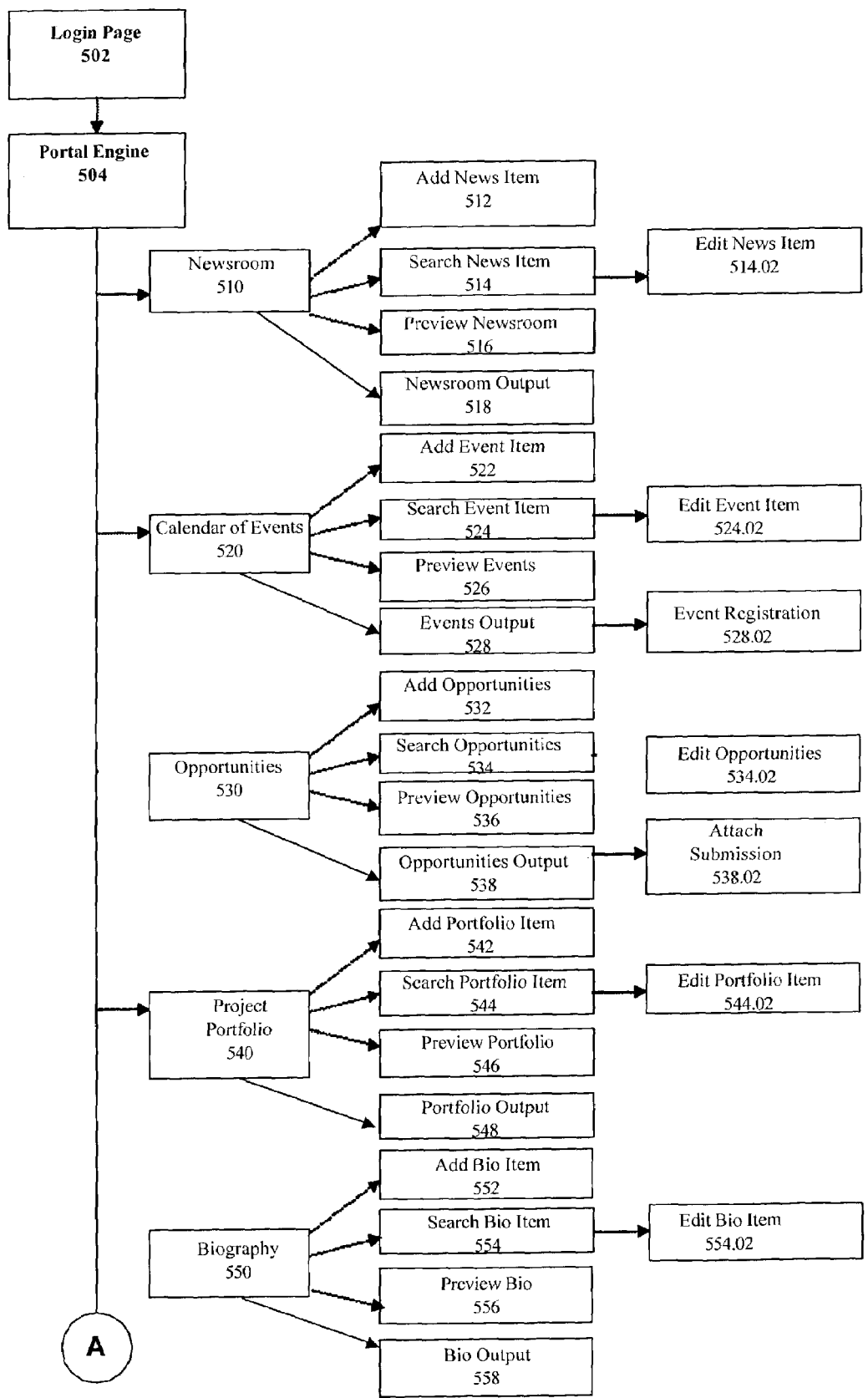
FIGS. 11, 12, and 13 are partial object diagrams that in the aggregate, illustrate one example of the some of the objects that can be incorporated into the system.
Figure 12:
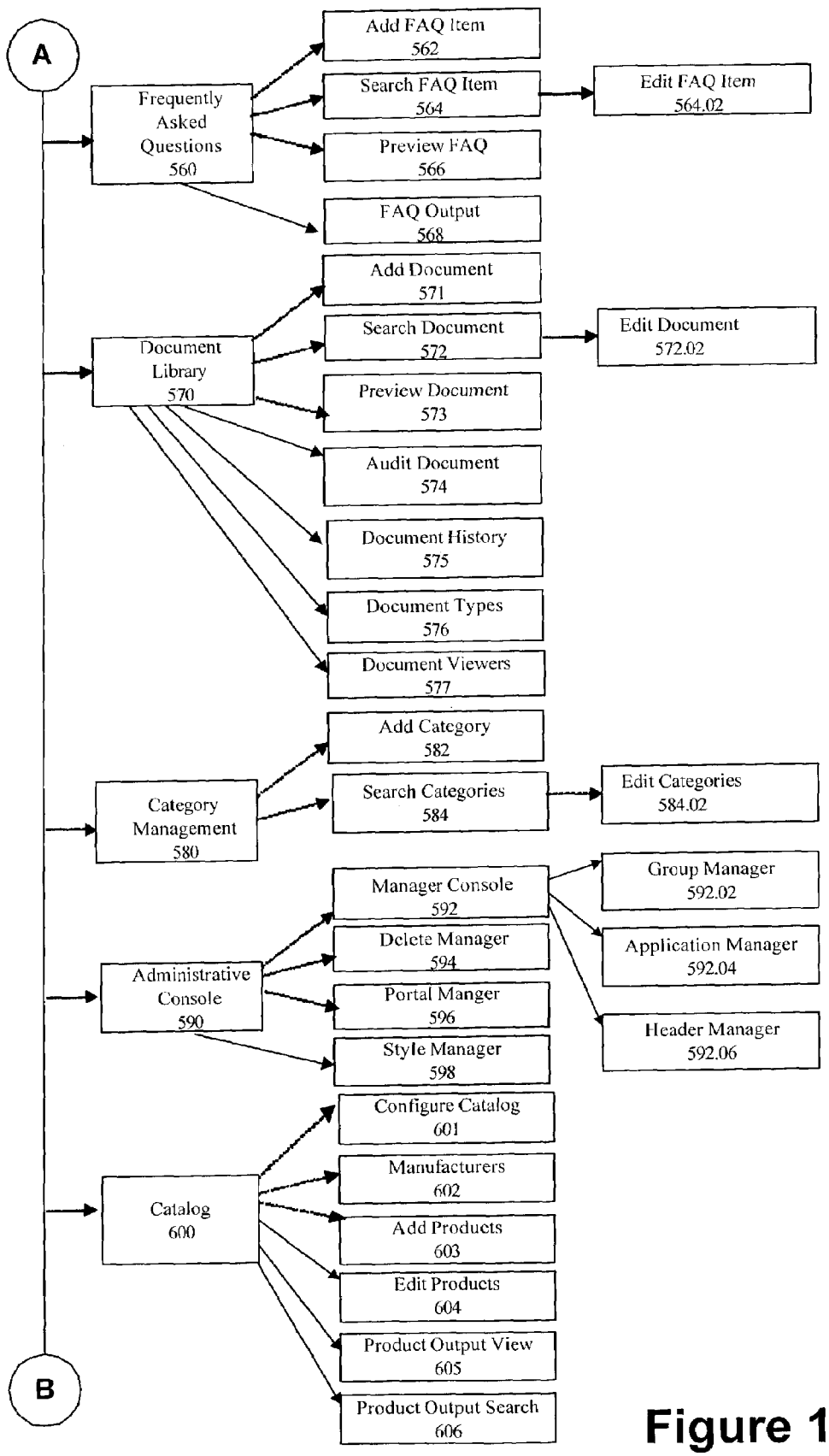
Figure 13:
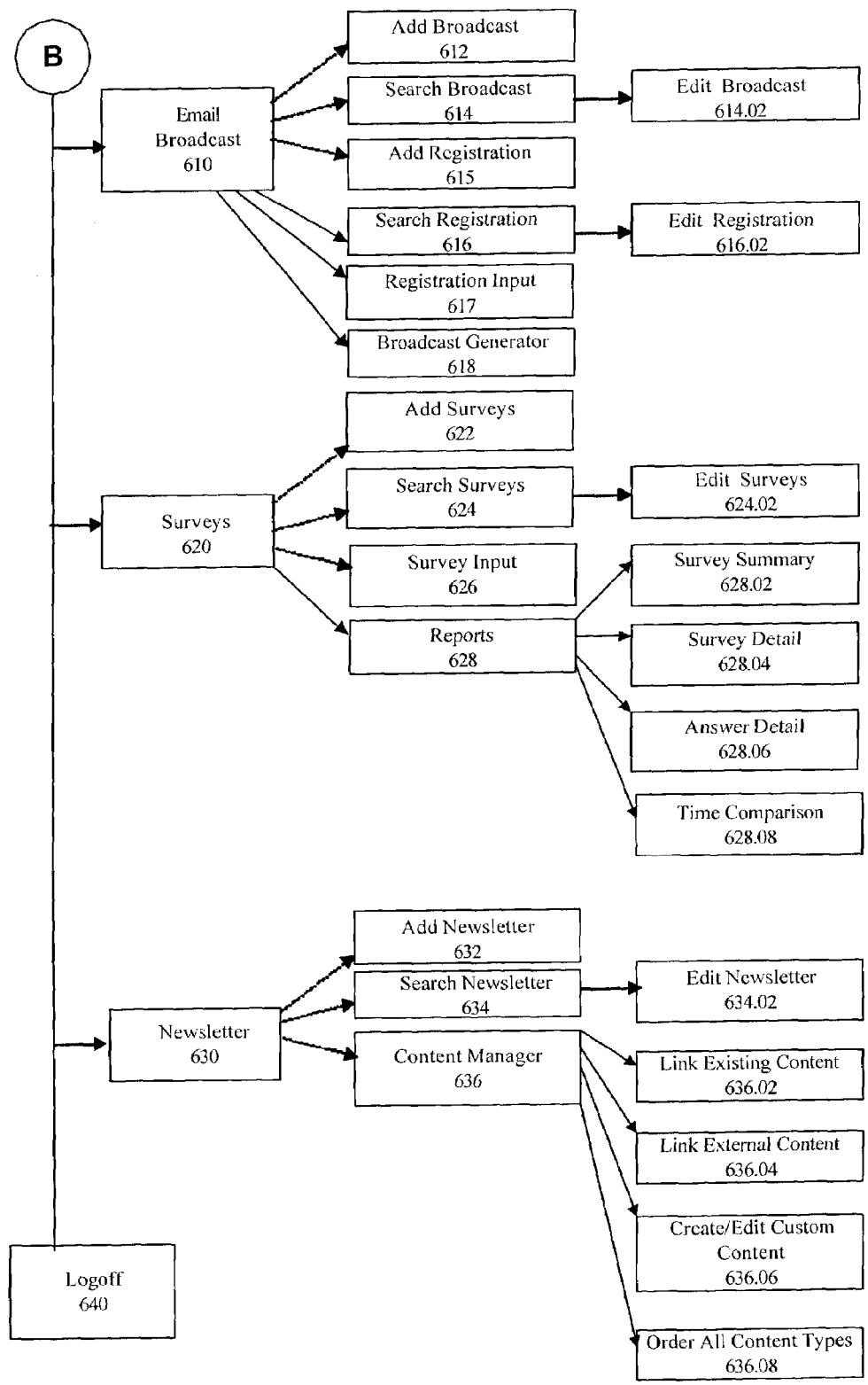

FIGS. 11, 12, and 13 are partial object diagrams that in the aggregate, illustrate one example of the some of the applications that can be incorporated into the system 20.

A. Login Page

A login page object 502 may be used by a content provider 22 to access the management functionality provided by the system 20. Profiles and roles can be attributed to the person logging in using the login page object 502.

B. Portal Engine

A portal engine object 504 is the mechanism by which the content of the web site is added, updated, deleted, and scheduled. The portal engine object 504 provides the ability to configure the various applications 30 of the system 20.

1. Newsroom

A newsroom object 510 allows the content provider 22 to manage a newsroom application. The newsroom application can be used to manage press releases and other forms of communications. An add news item object 512 can be used to add news items. A search news item object 514 can be used to search existing news items. An edit news item object 514.02 can be used to edit the news items that turned up in the search. A preview newsroom object 516 can be used to preview the appearance of the application 30 as currently modified by the content provider 22.

2. Calendar of Events

A calendar of events object 520 allows the content provider 22 to manage the events application 122. The calendar of events application 122 can be used to manage the calendar at all levels of an organization. An add event item object 522 can be used to add event items. A search event item object 524 can be used to search existing event items. An edit event item object 524.02 can be used to edit the event items that turned up in the search. A preview event object 526 can be used to preview the appearance of the application 30 as currently modified by the content provider 22. An event registration object 528.02 can be used to sign up for a particular event 88, so long as such a registration is in accordance with any business rules 80 regarding registration.

3. Opportunities

An opportunities object 530 allows the content provider 22 to manage the opportunity application 124. The opportunity application 124 can be used to publish and receive opportunity information on behalf of the organization. An add opportunities object 532 can be used to add opportunity items. A search opportunities item object 534 can be used to search existing opportunities. An edit opportunities object 534.02 can be used to edit the opportunity items that turned up in the search. A preview opportunity object 536 can be used to preview the appearance of the application 30 as currently modified by the content provider 22. An opportunities output object 538 can be used to allow users 50 to view opportunities. An attach submission object 538.02 can be used to respond to the opportunity by attaching a resume, business plan, offer letter, purchase order, or some similar type of document.

4. Project Portfolio

A project portfolio object 540 allows persons affiliated with an organization to manage projects using the project application 126 discussed above. The project application 126 can be used to manage the projects at all levels of an organization, subject to the parameters and conditions of the business rules 80. An add project object 542 can be used to add new projects. A search project object 544 can be used to search existing projects. An edit project object 544.02 can be used to edit the projects that turned up in the search. A preview project object 546 can be used to preview the appearance of the project application 126 as currently modified by the content provider 22. A project output object 548 can be used to implement in the "production environment" the version of the project that is visible from the preview object 546.

5. Biography

A biography object 550 allows persons affiliated with an organization to manage the display of biographical information using the biography application 135 discussed above. The biography application 135 can be used to manage the biographies of persons and groups at all levels of an organization, subject to the parameters and conditions of the business rules 80. An add biography object 552 can be used to add new biographies. A search biography object 554 can be used to search existing biographies. An edit biography object 554.02 can be used to edit the biographies that turned up in the search. A preview biography object 556 can be used to preview the appearance of the biography application 135 as currently modified by the content provider 22. A biography output object 558 can be used to implement in the "production environment" the version of the biography that is visible from the preview object 546.

6. Frequently Asked Questions

A frequently asked questions (FAQ) object 560 allows persons affiliated with an organization to manage the display of "frequently asked questions" using FAQ module of the communication application 130 discussed above. The FAQ application or module can be used to manage the FAQs to be asked of groups at all levels of an organization (subject to the parameters and conditions of the business rules 80). An add FAQ object 562 can be used to add new FAQs. A search FAQ object 564 can be used to search existing FAQs. An edit FAQ object 564.02 can be used to edit the FAQs that turned up in the search. A preview FAQ object 566 can be used to preview the appearance of the FAQ application as currently modified by the content provider 22. An FAQ output object 568 can be used to implement in the "production environment" the version of the FAQ that is visible from the preview object 546.

7. Document Library

A document library object 570 can be incorporated into the system 20 to manage access to documents, the ability to change documents, and document histories. The document library object 570 facilitates the functionality of the document library application 128. An add document object 571 can create entirely new documents. A search document object 572 can be used to search documents that already exist. A wide variety of search criteria can be utilized by the search document object 572. Documents located in the search can be edited by an edit document object 572.02. A preview document object 573 can be used by the content provider 22 to preview the changes made to the document, e.g. to see what the document would look like if it was saved as currently modified. An audit document object 574 can be used to audit those persons who have accessed the particular document. A document history object 575 can be used to track changes made to a document, and the various authors of those changes. A document types object 576 can be used to create, modify, and delete document types, e.g. categories of documents that can be used to distinguish the processing the system 20 and the business rules 80 used by the system 20. A document viewer object 577 allows persons to view documents stored on the system 20.

8. Category Management

Categories provide a useful way to fully normalize data. The ability to organize information in different categories allows the system 20 to support highly automated processing that is also highly configurable. Categories are stored on a categories database table that is described in greater detail below. A category management object 580 allows content providers 22 and administrators to manage category classifications. An add category object 582 can be used to create new categories. A search category object 584 can be used to search among existing category objects. An edit categories object 584.02 can be used to edit those categories that already exist.

9. Administrative Console

An administrative console object 590 provides the functionality of the portals in the interface subsystem 90. A manager console object 592 can be used to access lists of group managers through a group manager object 592.02, lists of application managers through an application manager object 592.04, and lists of header managers through a header manager object 592.06. A delete manager object 592 can be used to remove various personnel from one or more management roles. A portal management object 596 can be used to configure and manage various portals. Many business rules 80 can be configured through this object. A style manager object can be used to manage the portal templates and portal styles as described in greater detail above.

10. Catalog

A catalog object 600 is means for managing online catalogs of products and services (collectively "products"). A configure catalog object 601 can be used to configure the catalog application 134. A manufacturers object 602 can be used to interact with manufacturer information relating to the various products and services. An add products object 603 can be used to add new products and services to the web site. An edit products object 604 can be used to modify or delete products that already exist on the web site catalog 134. A product output view object 605 allows the content provider to preview what the new modified catalog 134 will look like if the changes are implemented in a runtime environment. A product output search object 606 allows users 50 to search the catalog using various search tools.

11. E-Mail Broadcast

An email broadcast object 620 can be used to manage functionality relating to e-mail broadcasts from the web site. An add broadcast object 612 can be used to create a new broadcast. A search broadcast object 614 can be used to search existing broadcasts. An edit broadcast object 614.02 can be used to modify broadcasts contained in the search results of a search. An add registration object 615 allows administrators to create sign-up interfaces so that users 50 can sign up for various broadcasts. A search registration object 616 allows administrators to search registration lists for certain registrants. An edit registration object 616.02 allows for the modification of registration information. A registration input object 617 can be used by users 50 to register for a broadcast. A broadcast generator object 618 can be used to actually generate and transmit the various broadcasts.

As described in the communications applications 130, broadcasts need not be limited to e-mails.

12. Surveys

A survey object 620 can perform the functionality of the survey application 132. An add surveys object 622 can be used to create new surveys. A search surveys object 624 can be used to perform searches for existing surveys using a variety of search tools and search criteria. An edit surveys object 624.02 can be used to edit any of the surveys in the search result. A survey input object 626 can be used to capture survey inputs from users 50.

A reports object 628 can automatically generate a wide variety of different reports relating to the survey inputs. A survey summary object 628.02 can provide a summary report in one of various predefined formats in accordance with the business rules 80. A survey detail object 628.04 can provide more detailed reports. An answer detail object 628.06 is for storing the actual responses provided by the users 50. A time comparison object 628.08 can track the amount of time spent with each answer.

13. Newsletter

A newsletter object 630 can perform the functionality of the newsletter application 120. An add newsletter object 632 can be used to create new newsletters or to create new newsletter content. A search newsletter object 634 can be used to conduct searches on existing newsletter content. A content manager object 636 can be used to manage the content of the newsletter. A link existing content object 636.02 can be used to link existing content. A link external content object 636.04 can be used to link to external content. A create/edit custom content object 636.06 can be used to add or modify customized newsletter content. An order all content types object 636.08 can be used to put together various contents into the unit of a newsletter.

IX. Database Table View

Figure 14:
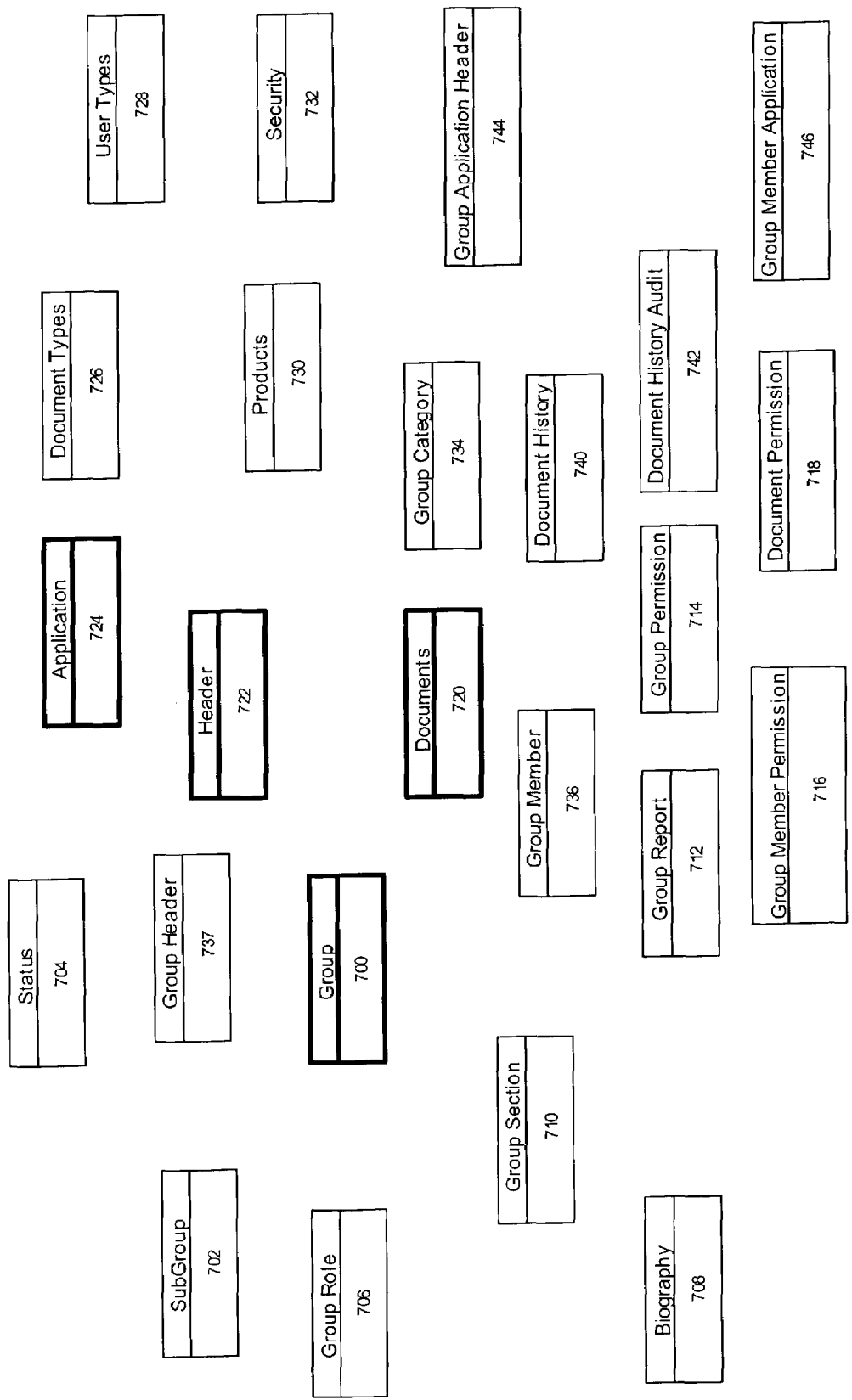
FIG. 14 is a data diagram illustrating one example of some of the data base tables that can be incorporated into the system.

FIG. 14 is a data diagram illustrating one example of some of the data base tables that can be incorporated into the system. The tables in FIG. 14 illustrate a fully normalized embodiment of the system 20. De-normalized embodiments of the system 20 may also be implemented. Different embodiments may include different tables, with different relationships between the various tables.

A. Group Table

A group table 700 is used to store information relating to organizational hierarchy. All subgroups in a subgroup table 702 exist as groups in the group table 700, permitting a fully recursive relationship. Thus, there are potentially no limits to the number of layers in an organizational hierarchy. Thus, an organization can have many groups, and those groups can have sub-groups, and so on and so forth. Some groups are organizations, while other groups are various subcategories such as groups or subgroups of organizations. The Group ID of the group table 700 is a foreign key on many other tables. Most system 20 processing can be broken down into the various organization hierarchies.

B. SubGroup Table

A subgroup table 702 works in conjunction with the group table 700 to permit multi-level organizations. The subgroup table 702 stores all parent-child relationships with respect to groups. Substantive data relating to any particular group is stored in the group table 700.

C. Status Table

A status table 704 is used to store various status states that can be used by the system. The key to the status table can be a foreign key in many different tables. In a preferred embodiment, the statuses supported by the system 20 are inactive and primarily active.

D. Group Role Table

A group role table 706 can be used by the system 20 to store various roles associated with a particular group. Similar to profiles, roles can determine how individuals interact with the system 20, and the types of content that can be accessed or updated.

E. Biography Table

A biography table 708 is used to support the functionality of the biography application 30. All input characteristics relating to the biography application described above are stored on this table.

F. Group Section Table

A group section table 710 is used by the system 20 to divide a group into sections. Unlike subgroups, a section cannot have subsections. In a preferred embodiment, a section does not belong to more than one group. Sections provide an additional way to modularize system 20 functionality.

G. Group Report Table

A group report table 712 is used by the system 20 to store report formats at the group level, another example of the highly modularized functionality of the system 20.

H. Group Permission Table

A group permission table 714 is used by the system 20 to store and process functionality and data permissions associated with a particular group.

I. Group Member Permission Table

A group member permission table 716 links to group permission table 714, and allows distinctions based on individual identify.

J. Document Permission Table

A document permission table 718 stores all information relating to the ability of groups and individuals to access documents, or to create/modify/delete documents.

K. Documents Table

A documents table 720 is for storing information relating to the documents themselves. In some embodiments, all document information is located directly in the documents table 720. In other embodiments, the documents table may contain links to files stored elsewhere in the system 20.

L. Header Table

A header table 722 is used for storing header information used by the system 20. Headers can be associated with sections on the web site.

M. Application Table

An application table 724 is used to store information relating to the applications 30 used by the system 20. The application table 724 can be linked to the group table 700, making applications dependent on group affiliation.

N. Documentation Types Table

A documentation types table 726 stores all of the different document types that can be created by content providers 22 and administrators, as discussed above. By categorizing documents into various document types, automation and configurability are facilitated.

O. User Types Table

A user types table 728 can store various categories of users 50 for the purposes of security (e.g. user types are not the same thing as user roles). These distinctions can be used by the business rules 80 to facilitate the flexibility and automation of the system 20.

P. Products Table

A products table 730 is used to store the products and services listed in the catalog application 134. Products in the products table 730 can be affiliated with particular groups in the groups table 700.

Q. Security Table

A security table 732 can link with the user types table 728 in determining the functionality and data that is available to any particular individual utilizing the system 20.

R. Group Category Table

A group category table 734 can be referred to simply as the category table. The category table provides a means for further normalizing data within a group or sub-group unit.

S. Group Member Table

A group member table 736 is used to store lists of individuals who belong to the various groups stored in the groups table 700.

T. Group Header Table

A group header table 737 is a table that links particular headers from the header table 722 to particular groups in the group table 700.

U. Document History Table

A document history table 740 stores the change history of the document, as discussed in greater detail above.

V. Document Audit History Table

A document audit history table 742 stores a history of every person who changes a document. In alternative embodiments, merely accessing the document will result in being listed on this table.

W. Group Application Header Table

A group application header table 744 links a particular application to a particular group and a particular header.

X. Group Member Application Table

A group member application table 746 lists group members who are allowed to access particular applications associated with a particular group.

X. Alternative Embodiments

In accordance with the provisions of the patent statutes, the principles and modes of operation of this invention have been explained and illustrated in multiple preferred and alternative embodiments. However, it must be understood that this invention may be practiced otherwise than is specifically explained and illustrated without departing from its spirit or scope.

The invention claimed is:

1. A network interface management system, comprising:
   an interface subsystem, including a portal configured to capture a plurality of input characteristics comprising a start date, a user characteristic, an end date, an application characteristic, a business rule, an organization characteristic, a transaction characteristic, a content provider characteristic, and an event;
   a content subsystem, including a Web site, a configurable application comprising at least four of a news application, a document library application, a project portfolio application, an organization application, a newsletter application, and an events application, and a configurable link comprising at least one of a uniform resource indicator and a TCP/IP address;
   wherein said network interface management system provides for generating said configurable application from said plurality of input characteristics;
   wherein said network interface management system provides for automatically embedding said configurable link on said Web site in accordance with said start date;
   wherein said network interface management system provides for automatically removing said configurable link from said Web site in accordance with said end date;
   wherein said configurable link points to said configurable application;
   wherein said interface subsystem further including a plurality of portals comprising a first portal and a second portal, wherein said input characteristics captured from said first portal generate a first subset of configurable applications, and wherein said input characteristics captured from said second portal generate a second subset of configurable applications; and
   wherein input characteristics are captured by said first portal and said second portal in a substantially simultaneous manner.

2. The system of claim 1, wherein said portal is a platform independent portal.

3. The system of claim 1, wherein said portal includes an input view and an output view.

4. The system of claim 3, wherein said input view includes at least one of an administration and a maintenance view.

5. The system of claim 1, wherein said system provides for automatically generating said configurable application from said input characteristics.

6. The system of claim 1, wherein said Web site is one of an intranet Web site, an extranet Web site, or an Internet Web site.

7. The system of claim 1, wherein said content interface provides for capturing said plurality of input characteristics from at least one of a non-technical content provider and an author.

8. The system of claim 1, said content subsystem further including a plurality of configurable applications and a plurality of configurable links pointing to said plurality of configurable applications, wherein each configurable application in said plurality of configurable applications does not have the same start date.

9. The system of claim 1, wherein said configurable link is a static code program.

10. The system of claim 1, said content subsystem further including a plurality of configurable application comprising at least five of a news application, a document library application, a project portfolio application, an organization application, a newsletter application, and an events application.

11. The system of claim 10, said content subsystem further including a plurality of configurable application comprising a news application, a document library application, a project portfolio application, a company bios application, a newsletter application, and an events application.

12. The system of claim 1, further comprising a plurality of business rules, wherein said configurable link and said configurable application is generated with said plurality of business rules.

13. The system of claim 12, wherein said plurality of business rules include at least two of a user-based rule, a group-based rule, an organization-based rule, and an Application Service Provider based rule.

14. The system of claim 12, further comprising a plurality of profiles associated with said portal, wherein said configurable link and said configurable application is generated with said plurality of profiles.

15. The system of claim 14, wherein said plurality of profiles includes at least two of a user-profile, a group-profile, an organization-profile, and an Application Service Provider profile.

16. The system of claim 14, wherein said plurality of profiles includes a subscriber-profile.

17. The system of claim 1, further comprising a plurality of Web sites and a plurality of organizations, wherein said plurality of organizations modify said plurality of Web sites with said system.

18. The system of claim 1, wherein said plurality of organizations modifies said plurality of Web sites in a substantially simultaneous manner.

19. A network interface management system, comprising:
- an interface subsystem, including a plurality of portal configured to capture a plurality of input characteristics comprising a user characteristic, a start date, an end date, an application characteristic, a business rule, an organization characteristic, a transaction characteristic, a content provider characteristic, and an event;
- a content subsystem, including a Web site, a plurality of configurable applications comprising at least four of a news application, a document library application, a project portfolio application, an organization application, a newsletter application, and an events application, and a plurality of configurable links comprising at least one of a uniform resource indicator and a TCP/IP address;
- wherein said network interface management system provides for selectively generating one or more said configurable applications from said plurality of input characteristics;
- wherein said configurable links are embedded on said Web site in accordance with said start date;
- wherein said configurable links are removed from said Web site in accordance with said end date;
- wherein said network interface management system provides for automatically embedding one or more said configurable links pointing to said generated configurable applications on said Web site
- wherein said plurality of portals comprising a first portal and a second portal, wherein said input characteristics captured from said first portal generate a first subset of configurable applications, and wherein said input characteristics captured from said second portal generate a second subset of configurable applications; and
- wherein input characteristics are captured by said first portal and said second portal in a substantially simultaneous manner.

20. The system of claim 19, wherein said configurable applications are generated without human intervention.

21. The system of claim 19, wherein a plurality of organizations access said plurality of portals.

22. The system of claim 21, wherein said plurality of organizations are charged a periodic subscription fee from an Application Service Provider.

23. The system of claim 19, further comprising a plurality of business rules and a plurality of profiles, wherein said system selectively generates one or more of said configurable applications from said plurality of business rules and said plurality of profiles.

24. The system of claim 23, wherein said plurality of business rules includes a user-rule, a group-rule, and an organization rule, and wherein said plurality of profiles includes a user-profile, a group-profile, and an organization-profile.

25. The system of claim 19, wherein said plurality of applications is associated with a plurality of predetermined application types.

26. The system of claim 25, wherein said plurality of predetermined application types include a news application, a newsletter application, an events application, an organization application, a document library application, an e-mail broadcast application, a frequently asked questions application, an employment opportunities application, a system maintenance application, and an administrative application.

27. The system of claim 25, wherein said first portal triggers a modification in a first application, and wherein said second portal triggers a modification in a second application.

28. The system of claim 21, wherein at least one said configurable link is a static code program.

29. A method, comprising:
- defining a plurality of profiles for a plurality of users;
- capturing a plurality of input characteristics comprising a user characteristic, a start date, an end date, an application characteristic, an organization characteristic, a transaction characteristic, a content provider characteristic, and an event from said plurality of users;
- selectively generating a plurality of configurable applications from said plurality of input characteristics, said configurable applications comprising at least four of a news application, a document library application, a project portfolio application, an organization application, a newsletter application, and an events application;
- scheduling a start date and end date for said plurality of configurable applications based on said plurality of input characteristics;
- embedding a plurality of links pointing to said plurality of configurable applications into a Web site in accordance with said start date, wherein said Web site is preformatted with respect to the location of said configurable applications;
- removing said plurality of links from said Web site in accordance with said end date
- wherein said plurality of portals comprising a first portal and a second portal, wherein said input characteristics captured from said first portal generate a first subset of configurable applications, and wherein said input characteristics captured from said second portal generate a second subset of configurable applications; and
- wherein input characteristics are captured by said first portal and said second portal in a substantially simultaneous manner.

* * * * *